US012775739B2

(12) United States Patent
Hudson et al.

(10) Patent No.: US 12,775,739 B2
(45) Date of Patent: Oct. 27, 2026

(54) AUTOMATED EXCLUSION OF PERSONALLY IDENTIFIABLE INFORMATION (PII) FROM CROWD-SOURCED INPUT TO ARTIFICIAL INTELLIGENCE (AI) MODEL OF AN INTEGRATION PLATFORM

(71) Applicant: Boomi, LP, Conshohocken, PA (US)

(72) Inventors: Michael J. Hudson, Delray Beach, FL (US); Dennis Matthew Mccarty, Pennsauken, NJ (US)

(73) Assignee: Boomi, LP, Conshohocken, PA (US)

( * ) Notice: Subject to any disclaimer, the term of this patent is extended or adjusted under 35 U.S.C. 154(b) by 116 days.

(21) Appl. No.: 18/920,008

(22) Filed: Oct. 18, 2024

(65) Prior Publication Data

US 2026/0111589 A1 Apr. 23, 2026

(51) Int. Cl.
*G06F 21/62* (2013.01)
*G06F 21/57* (2013.01)

(52) U.S. Cl.
CPC .......... *G06F 21/6245* (2013.01); *G06F 21/57* (2013.01)

(58) Field of Classification Search
CPC ............................ G06F 21/6245; G06F 21/57
See application file for complete search history.

(56) References Cited

U.S. PATENT DOCUMENTS

| | | | | |
|---|---|---|---|---|
| 11,314,748 | B2 | 4/2022 | Morton et al. | |
| 11,368,467 | B2 | 6/2022 | Schwartz et al. | |
| 2020/0081978 | A1* | 3/2020 | Ahmed | G06N 3/09 |
| 2020/0250139 | A1* | 8/2020 | Muffat | G06N 20/00 |
| 2022/0138345 | A1 | 5/2022 | Krishnan et al. | |
| 2022/0253446 | A1 | 8/2022 | Morton et al. | |
| 2025/0371261 | A1* | 12/2025 | Czerkies | G06F 40/20 |

* cited by examiner

*Primary Examiner* — Izunna Okeke
(74) *Attorney, Agent, or Firm* — Procopio, Cory, Hargreaves & Savitch LLP

(57) ABSTRACT

State-of-the-art techniques for detecting personally identifiable information (PII) in data-processing workflows are not scalable, are inefficient, and/or are prone to human error. Accordingly, disclosed embodiments utilize a PII classifier during the design phase or at compile time, for an integration process, to automatically determine the likelihood that each field in the integration code of the integration process is personally identifiable information. Fields identified as likely representing PII data may be automatically excluded from being indexed into the crowd-sourced historical data that are used to train an artificial intelligence (AI) model. This improves operational efficiency, scalability, flexibility, data quality, and accuracy of the AI model, as well as facilitating compliance with data privacy and security regulations, improving trust and adoption, and fostering proactive data management.

20 Claims, 5 Drawing Sheets

300

300

500

AUTOMATED EXCLUSION OF PERSONALLY IDENTIFIABLE INFORMATION (PII) FROM CROWD-SOURCED INPUT TO ARTIFICIAL INTELLIGENCE (AI) MODEL OF AN INTEGRATION PLATFORM

BACKGROUND

Field of the Invention

The embodiments described herein are generally directed to artificial intelligence (AI), and, more particularly, to the automated exclusion of personally identifiable information (PII) from the crowd-sourced input to an AI model of an integration platform.

Description of the Related Art

Integration Platform as a Service (iPaaS) enables the integration of applications and data. The iPaaS platform provided by Boomi® of Conshohocken, Pennsylvania, enables users to construct integration processes from pre-built steps, visually represented as "shapes," which each has a set of configuration properties. Each step dictates how an integration process retrieves data, manipulates data, routes data, sends data, and/or the like. These steps can be connected together in endless combinations to build simple to very complex integration processes.

The iPaaS platform may provide various tools to users, to facilitate the construction of integration processes. These tools may utilize artificial intelligence (AI) to provide suggestions to a user, based on historical data that have been crowd-sourced from other users' successful integration processes. For example, U.S. Pat. No. 8,943,076, issued on Jan. 27, 2015 ("the '076 patent"), which is hereby incorporated herein by reference as if set forth in full, describes a suggest engine that provides data mapping suggestions based on a history of previously encountered mappings, and U.S. Pat. No. 11,886,965, issued on Jan. 30, 2024 ("the '965 patent"), which is hereby incorporated herein by reference as if set forth in full, describes an AI model, trained on crowd-sourced integration processes, that suggests a step to be added to an integration process under construction based on existing steps in the integration process. The suggestion may include configuration properties of the step, including, for example, the default value(s) for one or more fields.

However, the historical data used for such AI-based tools may contain personally identifiable information (PII). The use of PII data in the historical data used to train or otherwise inform an AI-based tool raises privacy, security, and compliance concerns. In particular, if indexed into the crowd-sourced historical data, the PII data, from a first user, may be exposed in the output of the AI-based tool that is provided to a second user. Accordingly, any PII data should be scrubbed from the crowd-sourced historical data used by an AI-based tool.

State-of-the-art techniques for scrubbing PII data still require human intervention. For example, a human must generally go through and manually identify the PII fields. Alternatively, pattern matching (e.g., the format of a Social Security number, telephone number, email address, date, etc.) may be used to dynamically identify and mask PII fields during runtime. However, pattern matching may miss malformed values and PII fields which were not pre-contemplated, and therefore, for which no pattern was created. This results in PII data leaking through. Thus, state-of-the-art techniques are inefficient, resulting in bottlenecks in data-processing workflows, and are prone to human error, which may lead to potential breaches in privacy and security. Moreover, these state-of-the-art techniques become impractical when performed at scale for crowd-sourced historical data, for which the number of records may be in the hundreds of thousands, millions, billions, or more.

SUMMARY

Accordingly, systems, methods, and non-transitory computer-readable media are disclosed for the automated exclusion of personally identifiable information (PII) from crowd-sourced input to an AI model of an integration platform.

In an embodiment, a method comprises using at least one hardware processor to: generate a graphical user interface for construction of an integration process; during or after the construction of the integration process, in a background, apply a personally identifiable information (PII) classifier to integration code, representing the integration process, to classify each of a plurality of fields in the integration code into one of a plurality of classifications, wherein the plurality of classifications comprises a PII class and a non-PII class; determine one or more PII fields from the plurality of fields in the integration code based on the classifications of the plurality of fields; and exclude the one or more PII fields from being indexed into crowd-sourced historical data that are used for a predictive model.

The integration process may comprise a mapping step that maps one or more input fields to one or more output fields, wherein the plurality of fields in the integration code comprises the one or more input fields and the one or more output fields. The integration code may comprise a name of each of the one or more input fields and one or more output fields, wherein each of the one or more input fields and one or more output fields is classified into one of the plurality of classifications based on the names. The integration code may comprise a hierarchical structure of the one or more input fields, wherein each of the one or more input fields is classified into one of the plurality of classifications based on a path of that input field within the hierarchical structure of the one or more input fields. The integration code may comprise a hierarchical structure of the one or more output fields, wherein each of the one or more output fields is classified into one of the plurality of classifications based on a path of that output field within the hierarchical structure of the one or more output fields. The integration code may comprise an input hierarchical structure of the one or more input fields and an output hierarchical structure of the one or more output fields, wherein each of the one or more input fields is classified into one of the plurality of classifications based on a path of that input field within the input hierarchical structure, and wherein each of the one or more output fields is classified into one of the plurality of classifications based on a path of that output field within the output hierarchical structure.

The integration code may comprise a function, wherein the plurality of fields comprises one or more fields of the function. The one or more fields of the function may comprise a default field for the function. The default field for the function may be classified based on a classification of one or both of at least one input field to the function or at least one output field of the function.

The PII classifier may utilize pattern matching to classify each of the plurality of fields.

The PII classifier may output, for each of the plurality of fields, a metric representing a likelihood that the field represents personally identifiable information, and wherein classifying each of the plurality of fields comprises, for each of the plurality of fields: when the metric satisfies a first threshold, classifying the field into the PII class; and when the metric does not satisfy a second threshold, classifying the field into the non-PII class. Determining the one or more PII fields may comprise: for each of the plurality of fields that is classified into the PII class, automatically including that field in the one or more PII fields; and for each of the plurality of fields that is classified into the non-PII class, automatically excluding that field from the one or more PII fields.

The plurality of classifications may further comprise a potentially-PII class, wherein classifying each of the plurality of fields further comprises, for each of the plurality of fields, when the metric satisfies the second threshold but does not satisfy the first threshold, classifying the field into the potentially-PII class. Determining the one or more PII fields may further comprise, for each of the plurality of fields that have been classified into the potentially-PII class: prompting a user to identify whether or not the field represents personally identifiable information; receiving a user response to the prompt; and determining whether or not to include the field in the one or more PII fields according to the user response. The user may be prompted during construction of the integration process. The user may be prompted during compilation of the integration process. The method may further comprise using the at least one hardware processor to: receive a user input indicating a sensitivity for the PII classifier; and set one or both of the first threshold and the second threshold based on the indicated sensitivity.

The method may further comprise using the at least one hardware processor to: derive a training dataset from the crowd-sourced historical data; and train the predictive model using the training dataset.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for the automated exclusion of personally identifiable information (PII) from the crowd-sourced input to an AI model of an integration platform. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Infrastructure

Figure 1:
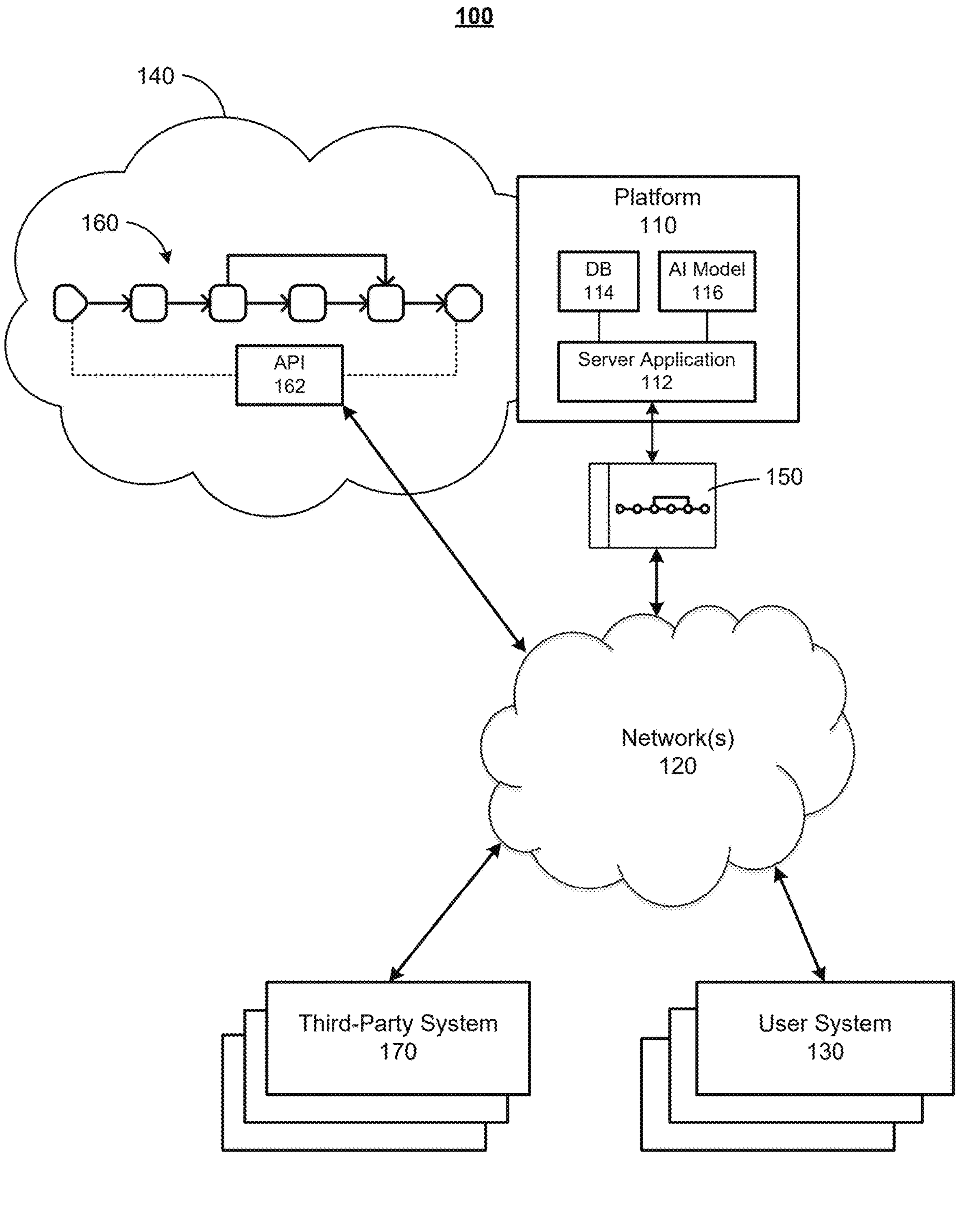
FIG. 1 illustrates an example infrastructure, in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. In particular, platform 110 may execute a server application 112, host a database 114 that may store data used by server application 112, and/or execute an artificial intelligence (AI) model 116 that may process data generated by server application 112 and/or stored in database 114 and/or generate data for use by server application 112 and/or storage in database 114. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed.

Platform 110 may be communicatively connected to one or more networks 120. Network(s) 120 enable communication between platform 110 and user system(s) 130. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to a plurality of user systems 130 through a single set of network(s) 120, it should be understood that platform 110 may be connected to different user systems 130 via different sets of one or more networks. For example, platform 110 may be connected to a subset of user systems 130 via the Internet, but may be connected to another subset of user systems 130 via an intranet.

While only a few user systems 130 are illustrated, it should be understood that platform 110 may be communicatively connected to any number of user system(s) 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer that has a user account for accessing server application 112 on platform 110. It should be understood that the integration developer may be anywhere from a novice, with little to no prior experience in integration development, to an expert, with many years of experience in integration development. When platform 110 is an iPaaS platform, each user account may be associated with an overarching organizational account for managing an integration platform on the iPaaS platform.

Server application 112 may manage an integration environment 140. In particular, server application 112 may provide a user interface 150 and backend functionality, including one or more of the processes disclosed herein, to enable users, via user systems 130, to construct, develop, modify, save, delete, test, deploy, un-deploy, and/or otherwise manage integration processes 160 within integration environment 140. User interface 150 may comprise a graphical user interface that implements a low-code environment, including potentially a no-code environment, in which users may construct integration processes 160.

The user of a user system 130 may authenticate with platform 110 using standard authentication means, to access server application 112 in accordance with permissions or roles of the associated user account. The user may then interact with server application 112 to manage one or more integration processes 160, for example, within a larger integration platform within integration environment 140. It should be understood that multiple users, on multiple user systems 130, may manage the same integration process(es) 160 and/or different integration processes 160 in this manner, according to the permissions or roles of their associated user accounts.

Although only a single integration process 160 is illustrated, it should be understood that, in reality, integration environment 140 may comprise any number of integration processes 160. In an embodiment, integration environment 140 supports integration platform as a service (iPaaS). In this case, integration environment 140 may comprise one or a plurality of integration platforms that each comprises one or a plurality of integration processes 160. Each integration platform may be associated with an organization, which may be associated with one or more user accounts by which respective user(s) manage the organization's integration platform, including the various integration process(es) 160.

An integration process 160 may represent a transaction involving the integration of data between two or more systems, and may comprise a series of elements that specify logic and transformation requirements for the data to be integrated. Each element, which may also be referred to herein as a "step" and have a visual representation referred to herein as a "shape," may transform, route, and/or otherwise manipulate data to attain an end result from input data. For example, a basic integration process 160 may receive data from one or more data sources (e.g., via an application programming interface 162 of the integration process 160), manipulate the received data in a specified manner (e.g., including mapping, analyzing, normalizing, altering, updating, enhancing, and/or augmenting the received data), and send the manipulated data to one or more specified destinations (e.g., via an application programming interface of each destination). An integration process 160 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

The functionality of server application 112 may include a process for constructing an integration process 160 within one or more screens of a graphical user interface of user interface 150. Embodiments of such functionality are disclosed, for example, in U.S. Pat. No. 8,533,661, issued on Sep. 10, 2013, which is hereby incorporated herein by reference as if set forth in full, and in the '965 patent. In particular, these applications describe functionality that enable the construction of integration processes 160 on a virtual canvas. The '965 patent further describes an example of an AI model 116 for suggesting steps to be added to an integration process 160, along with configurations of those steps, during construction of the integration process 160.

Each integration process 160, when deployed, may be communicatively coupled to network(s) 120. For example, each integration process 160 may comprise an application programming interface (API) 162 that enables clients to access integration process 160 via network(s) 120. A client may push data to integration process 160 through application programming interface 162, and/or pull data from integration process 160 through application programming interface 162.

One or more third-party systems 170 may be communicatively connected to network(s) 120, such that each third-party system 170 may communicate with an integration process 160 in integration environment 140 via application programming interface 162. Third-party system 170 may host and/or execute a software application that pushes data to integration process 160 and/or pulls data from integration process 160, via application programming interface 162. Additionally or alternatively, an integration process 160 may push data to a software application on third-party system 170 and/or pull data from a software application on third-party system 170, via an application programming interface of the third-party system 170. Thus, third-party system 170 may be a client or consumer of one or more integration processes 160, a data source for one or more integration processes 160, and/or the like. As examples, the software application on third-party system 170 may comprise, without limitation, enterprise resource planning (ERP) software, customer relationship management (CRM) software, accounting software, and/or the like.

2. Example Processing System

Figure 2:
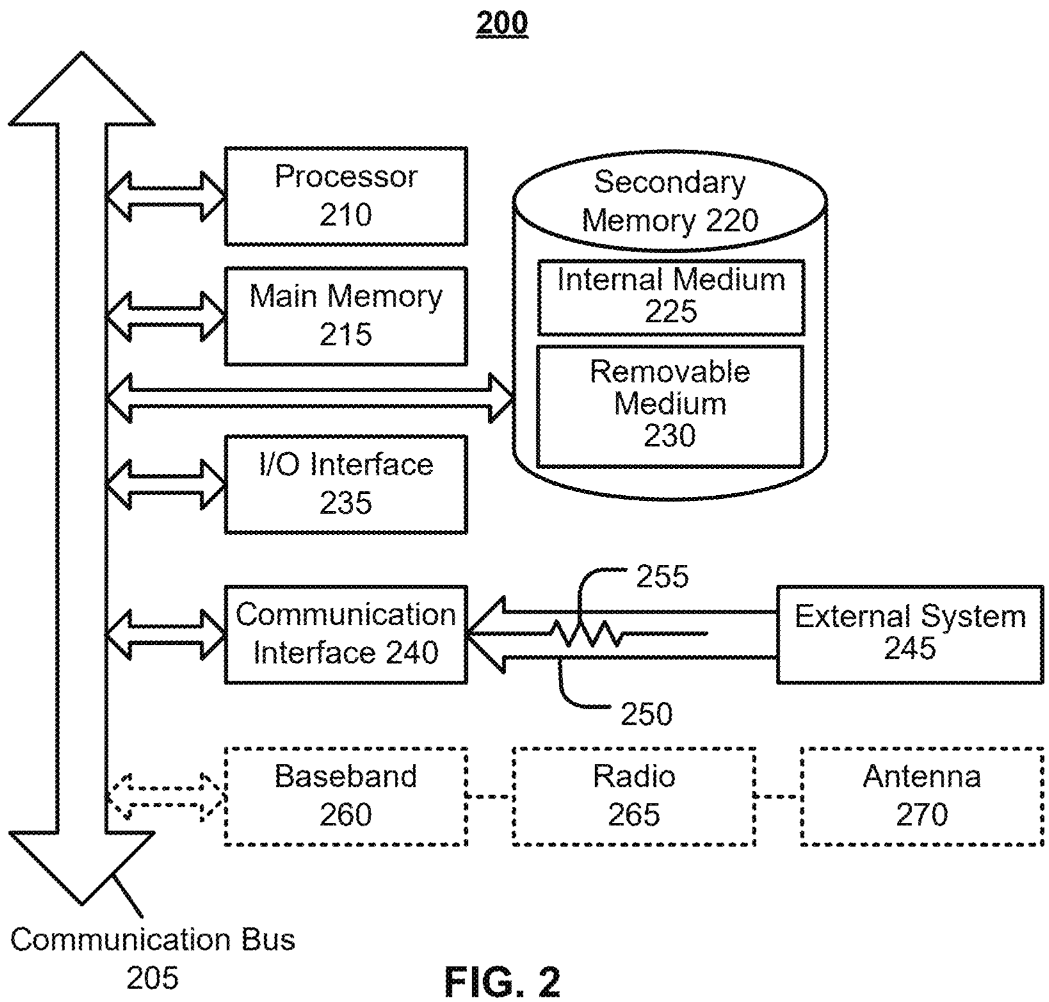
FIG. 2 illustrates an example processing system, by which one or more of the processes described herein may be executed, according to an embodiment.

FIG. 2 illustrates an example processing system, by which one or more of the processes described herein may be executed, according to an embodiment. For example, system 200 may be used to store and/or execute server application 112, and/or may represent components of platform 110, user system(s) 130, third-party system 170, and/or other processing devices described herein. System 200 can be any processor-enabled device (e.g., server, personal computer, etc.) that is capable of wired or wireless data communication.

Other processing systems and/or architectures may also be used, as will be clear to those skilled in the art.

System 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 may comprise main memory 215. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 are read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

System 200 may comprise an input/output (I/O) interface 235. I/O interface 235 provides an interface between one or more components of system 200 and one or more input and/or output devices. Examples of input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 200 may comprise a communication interface 240. Communication interface 240 allows software to be transferred between system 200 and external devices, networks, or other information sources. For example, computer-executable code and/or data may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, enables system 200 to perform one or more of the various processes disclosed herein.

In an embodiment that is implemented using software, the software may be stored on a computer-readable medium and initially loaded into system 200 by way of removable medium 230, I/O interface 235, or communication interface 240. In such an embodiment, the software is loaded into system 200 in the form of electrical communication signals 255. The software, when executed by processor 210, may cause processor 210 to perform one or more of the various processes disclosed herein.

System 200 may optionally comprise wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, baseband system 260 decodes the signal and converts it to an analog signal. Then, the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 may be communicatively coupled with processor(s) 210, which have access to memory 215 and 220. Thus, software can be received from baseband processor 260 and stored in main memory 210 or in secondary memory 220, or executed upon receipt. Such software, when executed, can enable system 200 to perform one or more of the various processes disclosed herein.

3. Data Flow

Figure 3:
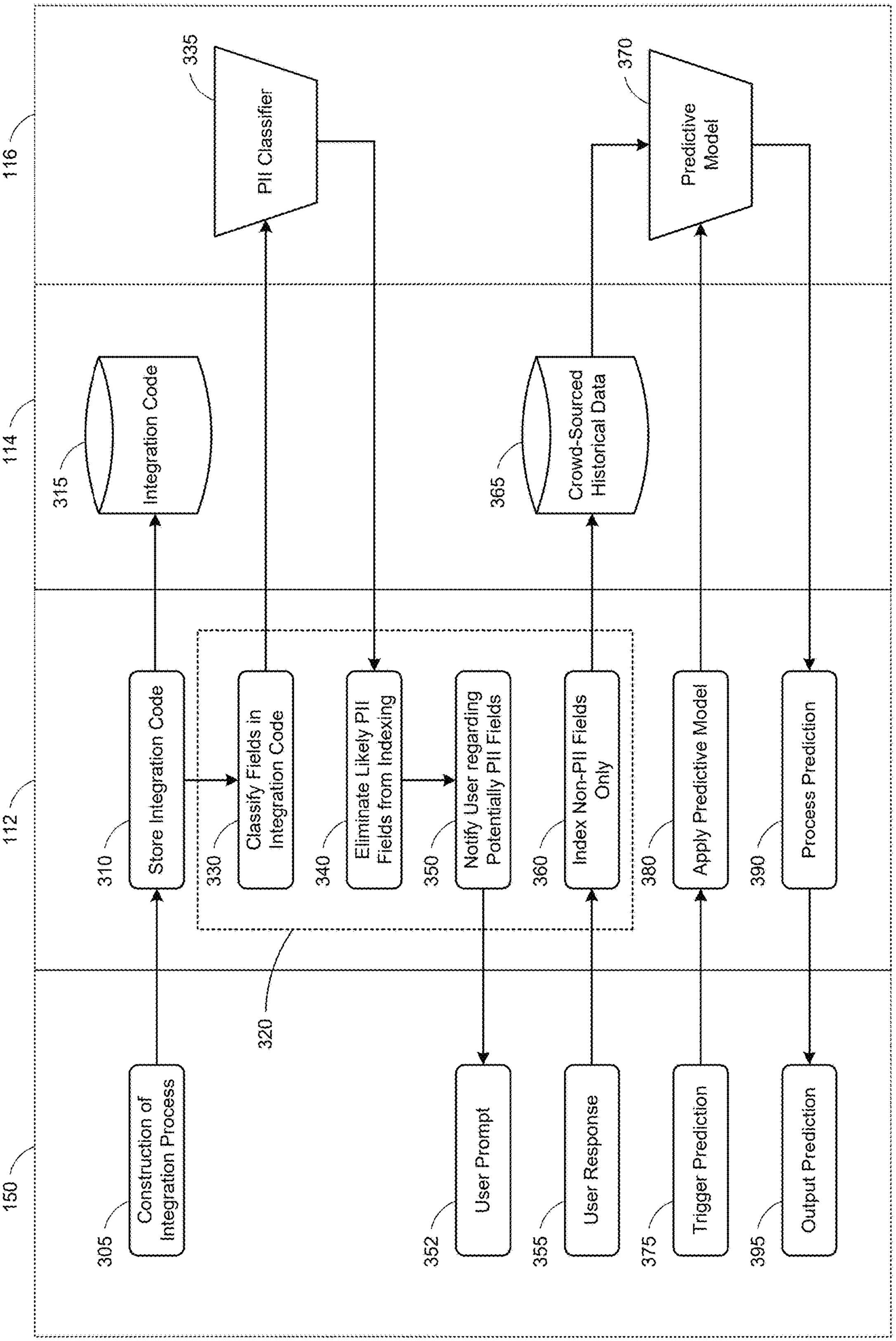
FIG. 3 illustrates an example data flow for the automated exclusion of personally identifiable information from the crowd-sourced input to an AI model of an integration platform, according to an embodiment.

FIG. 3 illustrates an example data flow 300 for the automated exclusion of personally identifiable information (PII) from the crowd-sourced input to an AI model of an integration platform, according to an embodiment. In data flow 300, user interface 150 may implement modules 305, 352, 355, 375, ands 395, server application 112 may implement modules 310, 320 (comprising modules 330, 340, 350, and 360), 380, and 390, database 114 may store integration code 315 and crowd-sourced historical data 365, and AI model 116 may comprise PII classifier 335 and predictive model 370. Modules 305, 310, 320 (comprising modules 330, 340, 350, and 360), 352, 355, 375, 380, 390, and 395 are preferably implemented as software modules (e.g., executed from main memory 215 and persistently stored in secondary memory 220), but could also be implemented as hardware modules or as modules comprising a combination of hardware and software.

Module 305 may generate a graphical user interface, within user interface 150, for the construction of an integration process 160. Using this graphical user interface, a user may construct an integration process 160 within user interface 150. The graphical user interface may comprise a virtual canvas on which a user may drag and drop and connect shapes, representing steps that perform specific functions within an integration process 160. Thus, the user may intuitively construct an integration process 160 by simply placing shapes on the virtual canvas and connecting those shapes together, to define data flows between the steps represented by those shapes.

Of particular relevance to certain embodiments, the integration process 160, being constructed, may comprise a mapping step that maps one or more input fields, according to an input schema, to one or more output fields, according to an output schema. The input schema and/or output schema may comprise a hierarchical structure. The mapping step may be used to convert data from an external format (e.g., used by a third-party software application) to an internal format (e.g., used within integration process 160 and/or within an overarching integration platform), an internal format to an external format, or a first external format (e.g., used by a first third-party software application) to a second external format (e.g., used by a second third-party software application). A mapping step may copy fields from the input schema to the output schema and/or transform fields in the input schema to fields in the output schema (e.g., one-to-one, many-to-one, one-to-many, or many-to-many). A transformation from input field(s) to output field(s) may be performed by a function, which may implement concatenation, splitting, computation, calculation, normalization, cleaning, altering, reformatting, augmenting, and/or any other manipulation. During the construction of integration process 160, the user may configure one or more mapping steps by selecting, constructing, or otherwise defining the input and output schemas, the mappings between the input and output schemas, the transformations, and/or the like.

Module 310 may, at one or more points in time, during the construction of integration process 160 via module 305, store new integration code, representing the constructed integration process 160, within integration code 315 in database 114. In an embodiment, module 310 may store the new integration code only after the integration process 160 has been completed and/or deployed. In an alternative embodiment, module 310 may store the new integration code at one or more points in time prior to completion or deployment of the integration process 160. After deployment of the constructed integration process 160, integration process 160 may be executed by loading the integration code, representing that integration process 160, from integration code 315 into integration environment 140.

Module 320, which may comprise modules 330, 340, 350, and 360, may, at one or more points in time, during or after the construction of integration process 160 or a mapping function classify the fields in the integration code to determine which fields in the integration code should be indexed for crowd-sourced historical data 365. Module 320 may be executed each time the user adds and/or configures a new step or certain type of step (e.g., mapping step) for integration process 160, after completion of integration process 160, upon deployment of integration process 160, and/or the like.

Classification module 320 is preferably executed during the design phase of integration process 160 or at compile time (i.e., the time at which integration process 160 is compiled), such that the PII fields are known prior to runtime. In this case, the PII fields do not have to be dynamically determined during runtime (i.e., the time at which integration process 160 is executed). Pre-knowledge of the PII fields increases the speed and efficiency of indexing the data, being integrated or otherwise processed, during runtime.

Classification module 320 may execute in the background. For example, module 320 may execute while the user continues to construct or otherwise manage integration process 160 or interacts with one or more other functions of server application 112. Thus, the user may be unaware that module 320 is being executed, unless prompted to classify one or more potential PII fields, as discussed elsewhere herein. This improves the user experience by only interrupting the user if and when necessary.

Module 330 may classify the fields in the integration code. In particular, module 330 may apply a personally identifiable information (PII) classifier 335 to the fields in the integration code, representing integration process 160, to classify each of a plurality of fields in the integration code into one of a plurality of classifications. In an embodiment, the input to PII classifier 335 comprises one or more features derived from the metadata associated with the plurality of fields. The metadata may comprise contextual information about the fields. For example, the input to PII classifier 335 may comprise the name of each of the plurality of fields, and/or the path of each of the plurality of fields within a corresponding hierarchical structure. In other words, PII classifier 335 may classify each of the plurality of fields into one of the plurality of classifications based on the names of the fields and/or the paths of the fields. Additionally or alternatively, the input to PII classifier 335 may comprise one or more features derived from the data that will be integrated by integration process 160. In other words, PII classifier 335 may classify each of the plurality of fields into one of the plurality of classifications based on the data to be processed by integration process 160.

Any suitable classifier may be used as PII classifier 335. One example of PII classifier 335 is the Boomi DataDetective™, offered by Boomi®. In an embodiment, PII classifier 335 comprises a machine-learning classifier that is trained using machine learning. Suitable machine-learning classifiers that may be used as PII classifier 335 include, without limitation, logistic regression, linear discriminant analysis (LDA), a Support Vector Machine (SVM), a decision tree, a k-Nearest Neighbors (kNN) algorithm, an artificial neural network, a naïve Bayes algorithm, a Bayesian network, a random forest, a Gradient Boosting Machine (GBM) (e.g., XGBoost, LightGBM, or CatBoost), an Adaptive Boosting (AdaBoost) algorithm, a voting classifier, and the like. Alternatively, PII classifier 335 may be a rules-based classifier, for example, that utilizes pattern matching to classify each of the plurality of fields. In an embodiment, PII classifier 335 may comprise a comprehensive algorithm that combines analysis of the name and/or path of each field, with pattern matching (e.g., to actual values of the field in data to be processed).

In an embodiment in which PII classifier 335 utilizes machine learning, PII classifier 335 may be trained, via supervised training, using a training dataset that comprises feature vectors labeled with a target one of the plurality of classifications. Each feature vector may comprise one or more features derived from metadata for a field (e.g., the name of the field and/or the path of the field) and potentially one or more features derived from the data to be processed (e.g., actual values of the field), and the label for that feature vector may indicate whether or not the field, represented by the feature vector, is personally identifiable information. PII classifier 335 may be trained by minimizing a loss function over a plurality of training iterations. In each training iteration, one feature vector from the training dataset may be input to PII classifier 335 to output a predicted classification, the loss function may calculate an error between the predicted classification and the target classification with which the feature vector is labeled, and one or more weights in PII classifier 335 may be adjusted, according to a suitable technique (e.g., gradient descent), to reduce the error of the loss function. A training iteration may be performed for each of the labeled feature vectors in the training dataset.

Module 330 may, for each of the plurality of fields in the integration code, input one or more features of that field into PII classifier 335. At least some of the features may be derived from metadata for the fields in the integration code. For example, the metadata may comprise a hierarchical structure, within which one or more of the fields are arranged, and module 330 may extract, as features, the name and path of each field within the hierarchical structure. Additionally or alternatively, at least some of the features may be derived from the data to be processed. It should be understood that, in an embodiment in which PII classifier 335 utilizes machine learning, the input to PII classifier 335 will comprise, for each of the plurality of fields, a feature vector that consists of values for the same set of features (e.g., name, path, features derived from the data to be processed, etc.) that were represented in the feature vectors in the training dataset used to train PII classifier 335.

PII classifier 335 may output, for each of the plurality of fields in the integration code, the classification of that field. For example, PII classifier 335 could simply output the single classification, from among a plurality of possible classifications, to which each field most likely belongs, optionally with a confidence value for the classification. Alternatively, PII classifier 335 could output an output vector comprising or consisting of a confidence value for each of the plurality of possible classifications. In this case, the one of the plurality of possible classifications with the highest confidence value would represent the predicted classification by PII classifier 335. In either case, the plurality of possible classifications may include at least a PII class, representing that a field represents personally identifiable information, and a non-PII class, representing that a field does not represent personally identifiable information. The plurality of possible classifications could also include a potentially-PII class, representing that PII classifier 335 was not able to determine whether or not the field represents personally identifiable information.

In a preferred embodiment, PII classifier 335 outputs, for each of the plurality of fields, a metric representing a likelihood that the field is personally identifiable information. It should be understood that, for a given field, this metric may be the confidence value that the field belongs to the PII class. In other words, the plurality of classifications, available to PII classifier 335, may consist of the PII class and the non-PII class, and the confidence value for the PII class may be used as the metric representing the likelihood that the field is personally identifiable information.

In an embodiment, module 330 may define only two classifications: a PII class; and a non-PII class. In this case, when the metric for a given field, representing a likelihood that the field is personally identifiable information, satisfies a predefined threshold (e.g., is equal to or greater than a value of the predefined threshold), module 330 automatically classifies that field into the PII class, and when the metric for the given field does not satisfy the predefined threshold value (e.g., is less than the value of the predefined threshold), module 330 automatically classifies that field into the non-PII class.

However, in a preferred embodiment, module 330 defines at least three classifications: a PII class; a potentially-PII class, and a non-PII class. In this case, when the metric for a given field, representing the likelihood that the field is personally identifiable information, satisfies a first threshold (e.g., is greater than or equal to the value of the first threshold), module 330 may classify that field into the PII class, and when the metric for the given field does not satisfy a second threshold (e.g., is less than the value of the second threshold, where the second threshold value is less than the first threshold value), module 330 may classify that field into the non-PII class. When the metric for the given field satisfies the second threshold (e.g., is greater than or equal to the value of the second threshold) but does not satisfy the first threshold (e.g., is less than the value of the first threshold), module 330 may classify that field into the potentially-PII class. The first and second thresholds may be set in any suitable manner, based on heuristics, machine learning, or the like. At a high level, fields that are confidently PII (i.e., for which the value of the metric is near the top of the possible range) will be classified into the PII class, fields that are confidently not PII (i.e., for which the value of the metric is near the bottom of the possible range) will be classified into the non-PII class, and all other fields (i.e., for which the value of the metric is in the middle of the possible range) will be classified into the potentially-PII class.

The sensitivity of PII classifier 335 may be a user-configurable setting. In particular, the graphical user interface of user interface 150 may comprise a screen, via which the user can configure one or more settings of PII classifier 335, including the sensitivity of PII classifier 335. For example, the user may be able to set one or both of the first threshold or the second threshold in the event of three classifications, or the predefined threshold in the event of two classifications. In other words, the user can set the boundary between what is classified as personally identifiable information and what is classified as not personally identifiable information and/or potentially identifiable information. The user may be able to set the specific value of each threshold and/or may be able to select one of a plurality of possible values for each threshold or one of a plurality of possible configurations for the thresholds, such as configurations representing normal sensitivity, high sensitivity (e.g., with at least a lower first threshold than for normal sensitivity), and low sensitivity (e.g., with at least a higher first threshold than for normal sensitivity). It should be understood that higher sensitivity will generally result in a greater percentage of fields being classified into the PII class and a lower percentage of fields being classified into the potentially-PII and/or non-PII classes, and that lower sensitivity will generally result in a lower percentage of fields being classified into the PII class and a greater percentage of fields being classified into the potentially-PII and/or non-PII classes. The ability for a user to set the sensitivity of PII classifier 335 enables PII classifier 335 to be customized to the user's particular needs, including, for example, specific regulatory requirements that apply to the data being processed by the user's integration platform. The user may be able to specify the sensitivity and/or other settings of PII classifier 335 on a per-process basis (i.e., for each individual integration process 160 or groups of integration processes 160), platform-wide basis (i.e., for the entire integration platform being managed by the user), regional basis (i.e., for individual geographical regions whose laws and regulations apply to particular instances of integration processes 160), and/or the like.

Module 340 may eliminate fields, that have been classified into the PII class, from indexing. In particular, each of the plurality of fields that is classified into the PII class may be automatically included in a set of PII fields. Each of these fields has been confidently determined, by PII classifier 335, to represent personally identifiable information. Therefore, no user input is required.

In contrast, module 340 may implicitly or explicitly ensure that any fields that have been classified into the non-PII class are included in indexing. For instance, each of the plurality of fields that is classified into the non-PII class may be automatically excluded from the set of PII fields. Each of these fields has been confidently determined, by PII classifier 335, to not represent personally identifiable information. Therefore, no user input is required.

Module 350 may seek user input for any fields that have been classified into the potentially-PII class. It should be understood that fields that have been classified into the potentially-PII class represent those fields that module 330 was not able to confidently classify as either representing personally identifiable information or not representing personally identifiable information. Module 350 may notify the user, regarding any of the fields that have been classified into the potentially-PII class, via module 352 of user interface 150. If no fields have been classified into the potentially-PII class, data flow 300 may skip module 350, and flow directly from module 340 to module 360.

Module 352 may prompt the user, via the graphical user interface of user interface 150, to manually classify each field that has been classified, by module 330, into the potentially-PII class. In particular, for each of the plurality of fields that is classified into the potentially-PII class, module 352 may prompt the user to identify whether or not that field represents personally identifiable information. For example, module 352 may generate a dialog that comprises, for each of the fields that have been classified into the potentially-PII class, an entry including an identifier or other descriptor of the field (e.g., name and/or path of the field, sample values of the field, default value of the field, etc.), an input for identifying the field as representing personally identifiable information, and/or an input for identifying the field as not representing personally identifiable information. If there are multiple such fields, all of the entries may be visually presented to the user in a list or table, simultaneously or with paging, or each of the entries may be visually presented to the user, one after the other for each user selection of an input, in a successive manner.

It should be understood that the user may be alerted and prompted, in this manner, during construction or deployment of the integration process, for example, either during the design phase or at compile time. This ensures that the user's responses are received, at a convenient time, from a user with the appropriate knowledge about the fields, while the details of each field are still fresh in the user's mind, for proactive data management. This, in turn, increases the accuracy of the user-specified classifications, and reduces the opportunity and likelihood for human error.

Module 355 receives the user response to the prompt, output by module 352, from the user. This user response may comprise a re-classification of each of the fields in the potentially-PII class into either the PII class or the non-PII class. In other words, for each of the fields in the potentially-PII class, the user response definitively identifies whether or not that field is personally identifiable information.

Module 360 indexes all of the non-PII fields, and none of the PII fields. In particular, module 360 may determine a final set of PII fields, from the plurality of fields in the integration code, based on the classifications of the plurality of fields. This final set of PII fields may consist of all of the fields that have been classified into the PII class, either by module 340 or user response 355. As discussed above, module 340 will automatically include any of the fields that PII classifier 335 classified into the PII class in this final set of PII fields, and automatically exclude any of the fields that PII classifier 335 classified into the non-PII class from this final set of PII fields. In addition, module 360 may, for each of the plurality of fields that have been classified into the potentially-PII class, determine whether or not to include the field in the set of PII fields according to user response 355. In particular, user response 355 will classify each remaining field (i.e., in the potentially-PII class) into either the PII class or the non-PII class. Any fields that have been classified, by the user, into the PII class will be included in the final set of PII fields, whereas any fields that have been classified, by the user, into the non-PII class will be excluded from the final set of PII fields.

In a contemplated embodiment, integration process 160 may comprise a mapping step that maps one or more input fields to one or more output fields. In this case, the plurality of fields that are classified by module 320 may comprise the input field(s) and the output field(s). The integration code, representing the mapping step in integration process 160, may comprise the name of each of the input field(s) and output field(s). Thus, each of the input field(s) and output field(s) may be classified, by module 320, into one of the plurality of classifications based on the name of the field.

In addition, the integration code, representing the mapping step, may comprise a hierarchical structure of the input field(s), and/or a hierarchical structure of the output field(s). It should be understood that a hierarchical structure may comprise a plurality of nodes, including a root node, one or more leaf nodes, and potentially one or more internal nodes. The root node may represent a top-level informational domain, each internal node, if any, may represent an informational subdomain, and each of the leaf nodes may represent a field. The path of a field is the path from the root node, through any internal nodes, to the leaf node representing that field. In an embodiment, each of the input field(s) is classified, by module 320, into one of the plurality of classifications based on the path of that input field within the hierarchical structure of the input field(s), and/or each of the output field(s) is classified, by module 320, into one of the plurality of classifications based on the path of that output field within the hierarchical structure of the output field(s). For example, PII classifier 335 may analyze the hierarchical structure(s) to determine the likelihood that the fields in the hierarchical structure(s) represent personally identifiable information.

The integration code, representing the mapping step, may comprise default values for one or more of the input and/or output fields. The default value is used for an input or output field, for example, when the data to be processed are missing a value for this field. It should be understood that a default value for a PII field may contain personally identifiable information.

In addition, the integration code, representing the mapping step, may comprise a function. In this case, the plurality of fields that are classified by module 320 may comprise one or more fields of the function. The function may map at least one input field to at least one output field. For example, the function could transform a single input field to a single output field, two or more input fields to a single output field, a single input field to two or more output fields, or the like. The field(s) of the function may comprise parameter values that are used by the function to transform the input field(s) to the output field(s). As an example, the field(s) of the function may comprise a default field for the function. The default field may define a default value that is used for an input or output field (e.g., if the data to be processed are missing a value for one of the input fields). In this case, the default field for the function may be classified, by module 320, based on a classification of one or both of at least one input field or at least one output field. For instance, if any input field to the function is classified into the PII class, the fields of the function, including any default fields, may also be classified, by module 320, into the PII class. Similarly, if any output field from the function is classified into the PII class, the fields of the function, including any default fields, may also be classified, by module 320, into the PII class. Conversely, if all input and/or output fields of the function have been classified into the non-PII class, the fields of the function, including any default fields, may be classified, by module 320, into the non-PII class.

The indexing, by module 360, determines which data (e.g., fields) will be indexed into crowd-sourced historical data 365 and which data (e.g., fields) will not be indexed into crowd-sourced historical data 365. Data which is indexed into crowd-sourced historical data 365 is available to train or otherwise inform predictive model 370, whereas data which is not indexed into crowd-sourced historical data 365 is not available to train or otherwise inform predictive model 370. For example, the default values of PII fields in the final set of PII fields and/or the default fields of functions whose input and/or output fields are in the final set of PII fields are excluded from crowd-sourced historical data 365. This ensures that no personally identifiable information is inadvertently used in downstream predictive model 370.

Predictive model 370 may comprise any AI model that is configured (e.g., trained) to output a prediction for new data based on crowd-sourced historical data 365. For example, predictive model 370 may comprise or consist of the model described in the '076 patent and/or the '965 patent, which predicts the next step in an integration process 160, based on the existing set of steps in the integration process 160, during construction of the integration process 160. However, predictive model 370 may comprise other types of AI models, such as an AI model that performs an automated function (e.g., approving expense reports), suggests default values for fields in a mapping or other step of an integration process 160, predicts the performance of an integration process 160, predicts errors and/or error resolutions for an integration process 160, or the like. In an embodiment, a training dataset may be derived from crowd-sourced historical data 365 (i.e., all the data that have been indexed into crowd-sourced historical data 365), and used to train predictive model 370 using supervised or unsupervised learning. Alternatively, predictive model 370 may search or otherwise analyze crowd-sourced historical data 365 to determine predictions.

In any case, a user may directly or indirectly trigger a prediction, via module 375 of user interface 150, for input data. Alternatively, the prediction may be automatically triggered. In either case, in response to the trigger, module 380 may apply predictive model 370 to the input data, to determine a prediction. Module 390 may process the prediction, output by predictive model 370 to, for example, generate a representation of the prediction. This representation of the prediction may then be output to the user via module 395 of user interface 150. For example, the representation of the prediction may be visually or graphically displayed to the user within a screen in the graphical user interface of user interface 150.

4. Process

Figure 4:
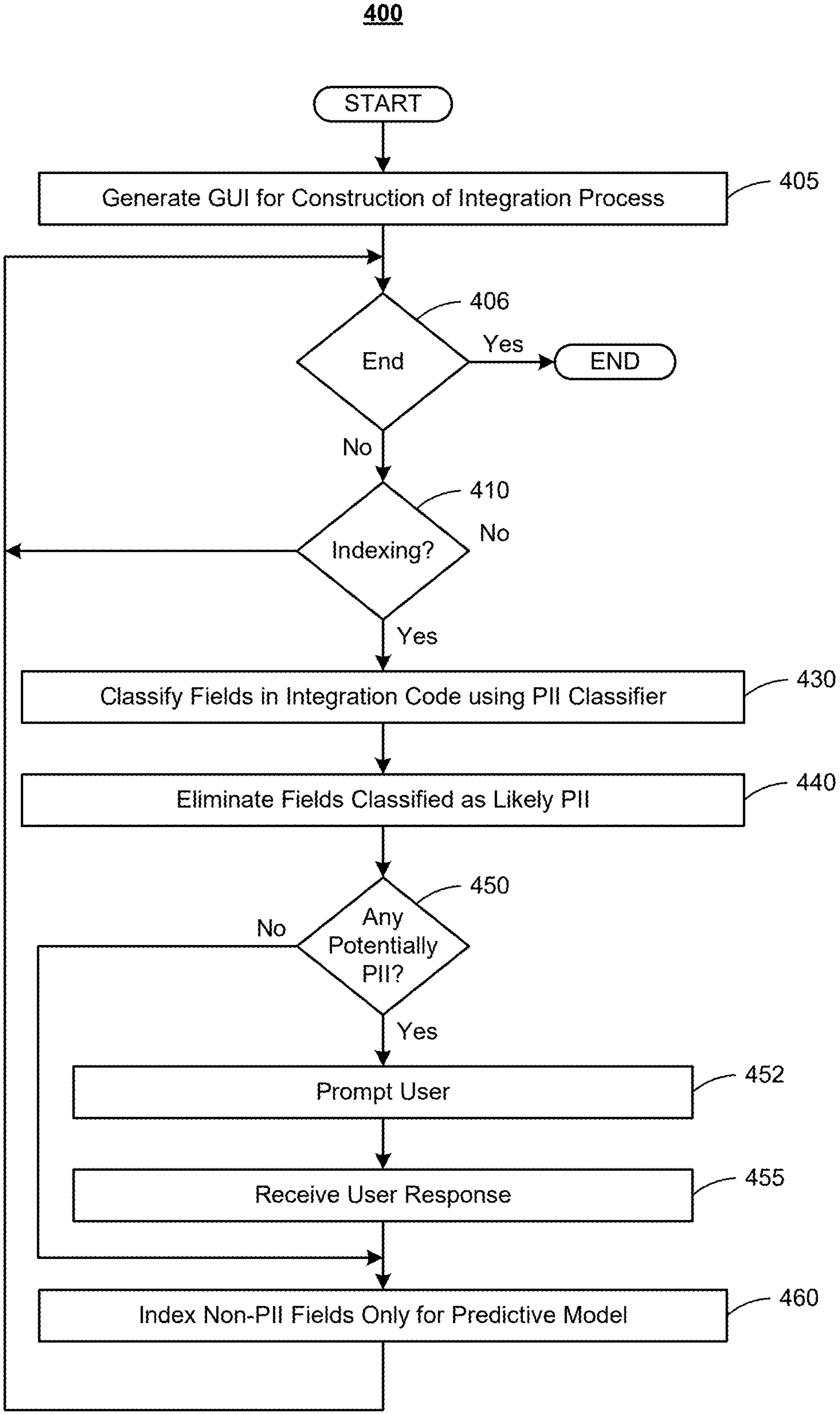
FIG. 4 illustrates a process for the automated exclusion of personally identifiable information from the crowd-sourced input to an AI model of an integration platform, according to an embodiment.

FIG. 4 illustrates a process 400 for the automated exclusion of personally identifiable information from the crowd-sourced input to an AI model of an integration platform, according to an embodiment. Process 400 may be implemented in server application 112. While process 400 is illustrated with a certain arrangement and ordering of subprocesses, process 400 may be implemented with fewer, more, or different subprocesses and a different arrangement and/or ordering of subprocesses. Furthermore, any subprocess, which does not depend on the completion of another subprocess, may be executed before, after, or in parallel with that other independent subprocess, even if the subprocesses are described or illustrated in a particular order.

Initially, subprocess 405 may generate a graphical user interface of user interface 150 for the construction of an integration process 160. The graphical user interface may comprise a virtual canvas on which shapes, representing components of integration process 160, are dragged and dropped to construct the integration process 160. In particular, the user may drag shapes, representing steps, onto the virtual canvas, and then connect those shapes. Embodiments of the graphical user interface are disclosed in U.S. Pat. No. 8,533,661, issued on Sep. 10, 2013, which is hereby incorporated herein by reference as if set forth in full.

Subprocess 406 may determine whether or not to end process 400. Subprocess 406 may determine to end process 400 when the user navigates away from the current screen (i.e., comprising the virtual canvas) of the graphical user interface, discards integration process 160 or otherwise cancels construction of integration process 160, and/or the like. When determining to end (i.e., “Yes” in subprocess 406), process 400 may end. Otherwise, when not determining to end (i.e., “No” in subprocess 406), process 400 may proceed to subprocess 410.

Subprocess 410, which may be implemented by module 310, may determine whether or not to index the integration process 160 that is being or has been constructed via the graphical user interface. It may be determined to index integration process 160 once integration process 160 has been completed or when integration process 160 is being or has been compiled. The completion of integration process 160 may be indicated by a user operation, such as the user selection of an input for saving, deploying, and/or compiling integration process 160. In this case, subprocess 410 may determine to index integration process 160 in response to the user operation. Alternatively, subprocess 410 may determine to index integration process 160 in response to another trigger (e.g., each time integration process 160 is modified). In any case, when determining to index integration process 160 (i.e., “Yes” in subprocess 410), process 400 may proceed to subprocess 430. Otherwise, when not determining to index integration process 160 (i.e., “No” in subprocess 410), process 400 may continue to wait for either a determination to end in subprocess 406 or a determination to index in subprocess 410.

Subprocess 430, which may be implemented by module 330, may classify the integration code, representing the integration process 160 that is being or has been constructed via the graphical user interface, using PII classifier 335. In particular, as discussed elsewhere herein, module 330 may, for each of the plurality of fields in the integration code, extract one or more features of the field, such as the name of the field, the path of the field, and optionally actual values of the field, and input those feature(s) to PII classifier 335. For each of the plurality of fields, PII classifier 335 may output one of a plurality of classifications, such as a PII class, non-PII class, and optionally a potentially-PII class, representing the predicted class of the field, and optionally a confidence value of the classification. Alternatively, for each of the plurality of fields, PII classifier 335 may output a metric representing the likelihood that the field represents personally identifiable information, and module 330 may classify the field into one of the plurality of classifications based on the metric. For example, if the metric satisfies a first threshold, the field may be classified into the PII class, when the metric does not satisfy a second threshold, the field may be classified into the non-PII class, and when the metric satisfies the second threshold but does not satisfy the first threshold (i.e., is between the first and second thresholds), the field may be classified into the potentially-PII class.

Subprocess 440, which may be implemented by module 340, may eliminate any fields that have been classified as likely personally identifiable information. In particular, as discussed elsewhere herein, module 340 may initialize a set of PII fields to be excluded from indexing. Each of the plurality of fields that is classified into the PII class may be automatically included in the set of PII fields, and each of the plurality of fields that is classified into the non-PII case may be automatically excluded from the set of PII fields. After subprocess 440, only those fields, if any, that have been classified into the potentially-PII class will remain for further consideration.

Subprocess 450, which may be implemented by module 350, may determine whether any unresolved fields remain to be considered. In particular, module 350 may determine whether or not any of the plurality of fields were classified into the potentially-PII class by module 330 in subprocess 430. When determining that at least one field has been classified into the potentially-PII class (i.e., “Yes” in subprocess 450), process 400 may proceed to subprocess 452. Otherwise, when determining that no fields have been classified into the potentially-PII class (i.e., “No” in subprocess 450), process 400 may proceed to subprocess 460. In this latter case, the set of PII fields is complete.

Subprocess 452, which may be implemented by module 352, may, for each of the plurality of fields that have been classified into the potentially-PII class, prompt the user to identify whether or not the field represents personally identifiable information. For example, as discussed elsewhere herein, the graphical user interface of user interface 150 may generate a dialog that comprises an entry for each of the fields that has been classified into the potentially-PII class. Each entry may comprise an identifier or other descriptor of the field (e.g., name and/or path of the field, sample values of the field, etc.), a first input for identifying the field as representing personally identifiable information, and a second input for identifying the field as not representing personally identifiable information. Advantageously, subprocess 452 may be performed during the design phase or at compile time, to ensure that the user being prompted has the requisite knowledge and familiarity with the fields.

Subprocess 455, which may be implemented by module 355, may receive the user response. In particular, when the user selects the first input for a field, the field may be reclassified into the PII class. On the other hand, when the user selects the second input for the field, the field may be reclassified into the non-PII class. Thus, the user may manually verify which classification is appropriate for all fields whose classification could not be confidently determined by PII classifier 335.

Subprocess 460, which may be implemented by module 360, may establish which data (e.g., fields) should be indexed for the crowd-sourced historical data 365 used by predictive model 370. In particular, module 360 may update the set of PII fields based on the user response. In other words, for each of the plurality of fields that have been classified into the potentially-PII class, module 360 may determine whether or not to include that field in the set of PII fields according to the user response. It should be understood that, if the user response indicates that a field represents personally identifiable information, the field will be included in the set of PII fields, and when the user response indicates that a field does not represent personally identifiable information, the field will not be included in the set of PII fields. Thus, after subprocess 460, the set of PII fields has been definitively established for integration process 160.

Subprocess 410-450 and 460 may be performed in the background, while the user interacts with one or more other functions provided via the graphical user interface. In this case, the user's only exposure to the PII classification of module 320 is in subprocesses 452 and 455, which are only performed when unresolved fields remain after subprocess 440. In some cases, there may be no unresolved fields, in which case, the user may not know that the PII classification has been performed. This improves the user experience, since the user is only interrupted to resolve the classification of fields, if any, that cannot be automatically classified by PII classifier 335. Even in cases where there are unresolved fields, the number of fields that the user must resolve manually will generally be small, depending on the sensitivity of PII classifier 335, which may be configured by the user as discussed elsewhere herein.

Subsequently, the non-PII data (e.g., non-PII fields) are indexed into crowd-sourced historical data 365, which may be used to train or otherwise inform predictive model 370. However, any of the data (e.g., default values) for fields that have been included in the final set of PII fields, established in subprocess 460, will be excluded. Thus, only data for fields that have been classified into the non-PII class will be indexed. This ensures that no personally identifiable information leaks into predictive model 370.

In an embodiment, data compliance may be certified based on process 400. In particular, integration processes 160 and/or integration platforms that utilize process 400, to exclude personally identifiable information from indexing, may be certified as compliant with one or more regulations governing the use of personally identifiable information. For example, based upon the successful exclusion of PII data via process 400, server application 112 may issue a certificate of compliance, which may be provided to one or more regulatory agencies.

5. Example Application

Figure 5:
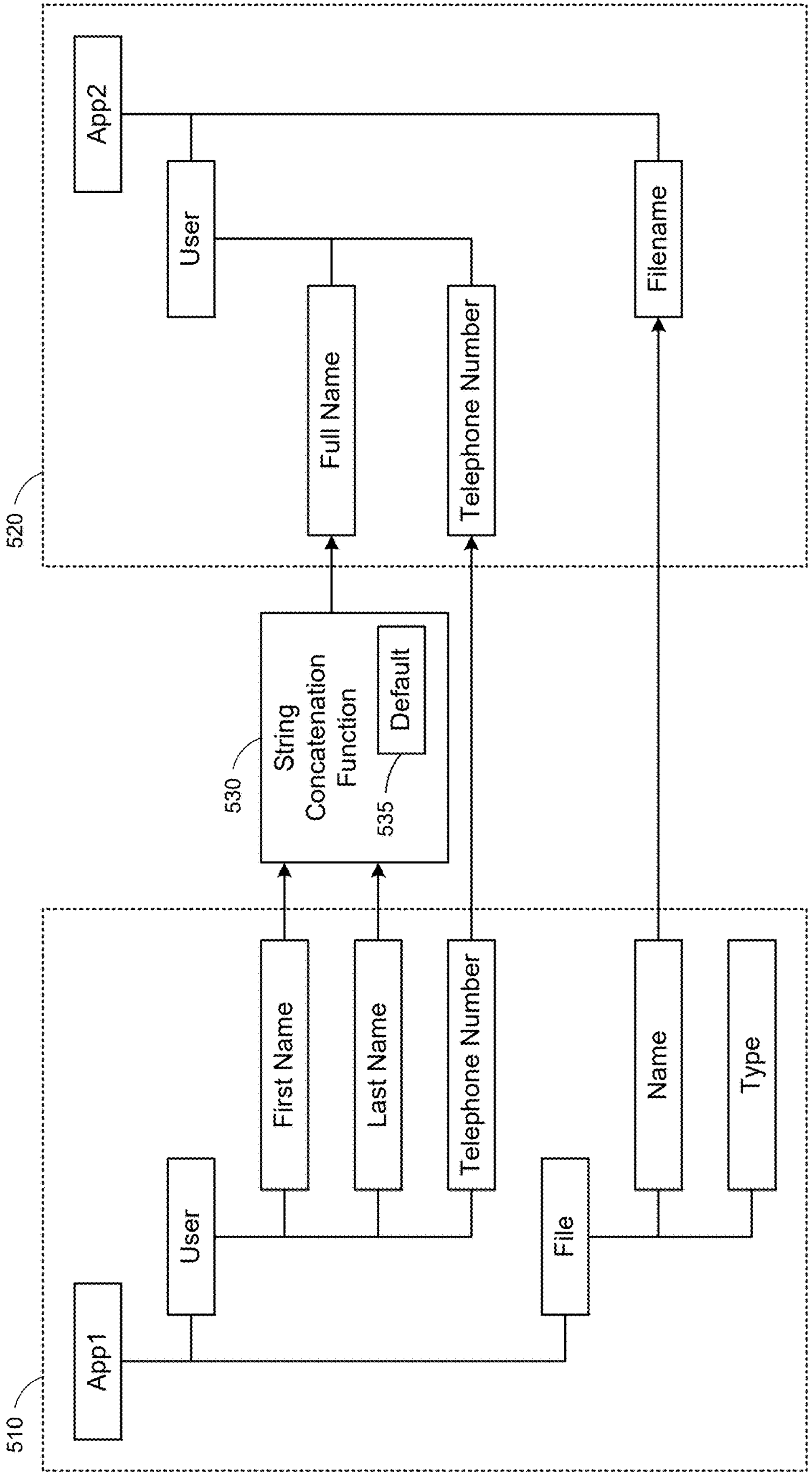
FIG. 5 illustrates a mapping between two hierarchical structures, according to an illustrative example.

FIG. 5 illustrates a mapping 500 between two hierarchical structures 510 and 520, according to an example that illustrates an application of disclosed embodiments. Mapping 500 maps input fields in an input hierarchical structure 510 to output fields in an output hierarchical structure 520. The input fields comprise a first name, whose path is App1: User: First Name, a last name, whose path is App1: User: Last Name, a telephone number, whose path is App1: User: Telephone Number, a name, whose path is App1: File: Name, and a type, whose path is App1: File: Type. The output fields comprise a first and last name, whose path is App2: User: Full Name, a telephone number, whose path is App2: User: Telephone Number, and a filename, whose path is App2: Filename. App1: User: First Name and App1: User: Last Name map, through string concatenation function 530, to App2: User: Full Name, App1: User: Telephone Number maps to App2: User: Telephone Number, and App1: File: Name maps to App2: Filename.

When executed on mapping 500, module 320 may classify App1: User: First Name, App1: User: Last Name, App1: User: Telephone Number, App2: User: Full Name, and App1: User: Telephone Number into the PII class, classify App1: File: Name and App2: Filename into the potentially-PII class, and classify App1: File: Type into the non-PII class, based on their names and paths. Notably, string concatenation function 530 concatenates the values of App1: User: First Name and App1: User: Last Name into App2: User: Full Name, and may comprise a default field 535, which specifies a default value (e.g., John Doe), for example, for when the values of App1: User: First Name and/or App1: User: Last Name are null. Because the inputs and output of string concatenation function 530 are classified into the PII class, module 320 may automatically classify default field 535 into the PII class as well.

The fields classified into the non-PII class may then be indexed into crowd-sourced historical data 365. In particular, App1: File: Type will be automatically indexed into crowd-sourced historical data 365, whereas App1: User: First Name, App1: User: Last Name, App1: User: Telephone Number, App2: User: Full Name, and App1: User: Telephone Number will be automatically excluded from crowd-sourced historical data 365. App1: File: Name and App2: Filename may or may not be indexed into crowd-sourced historical data 365, depending on user response 355. For instance, if App1: File: Name and/or App2: Filename are associated with a default value of "JohnDoe.dat", which contains personally identifiable information, the user may classify these fields into the PII class, resulting in exclusion of these fields from crowd-sourced historical data 365. On the other hand, if App1: File: Name and/or App2: Filename are associated with a default value of "GenericFile.dat", which does not contain personally identifiable information, the user may classify these fields into the non-PII class, resulting in inclusion of these fields in crowd-sourced historical data 365.

6. Potential Advantages

Disclosed embodiments may increase operational efficiency in data-processing work flows. By automating the detection and exclusion of PII data from indexing, embodiments reduce the time and resources required by manual scrubbing techniques. This, in turn, streamlines the data transformation process, resulting in faster deployment and lower operational costs. In addition, the automation minimizes the risk of human error in identifying and scrubbing PII data, which ensures a more reliable and consistent approach to data management.

Disclosed embodiments may provide scalability and flexibility for PII determinations. The automated detection and exclusion of PII data enables disclosed embodiments to be highly scalable and suitable for businesses of any size, from small enterprises to very large corporations. In addition, disclosed embodiments can be easily integrated into existing software (e.g., for constructing or compiling integration processes 160, constructing data mappings, etc.). This provides flexibility and case of adoption, without requiring significant changes in the existing infrastructure.

Disclosed embodiments may enhance AI-model integrity. Ensuring that AI models, such as predictive model 370, are trained only on non-PII data enhances the overall data quality, which results in improved performance of the AI models. In addition, the exclusion of PII data improves the ethical standards of the AI models, which may result in greater acceptance of AI-driven features. For example, organizations may be more inclined to adopt AI-driven features and services if they are confident that the underlying AI models do not compromise data privacy and security.

Disclosed embodiments may enhance compliance of data-processing work flows. The automated exclusion of PII data from AI-model training data facilitates an organization's compliance with stringent data privacy regulations, such as GDPR, CCPA, and HIPAA. This compliance is crucial to avoiding legal penalties and maintaining good standing with regulatory agencies. In addition, server application 112 may log, and potentially alert users, whenever PII data are identified, to establish a transparent audit trail. This facilitates the organization's ability to demonstrate compliance during audits.

Disclosed embodiments may improve customer trust. Customers are increasingly concerned about data privacy and security. By integrating automated PII exclusion into integration platforms, an organization can assure its customers that their sensitive data are being handled with the utmost care, thereby fostering trust and loyalty. In addition, this automated PII exclusion reduces the likelihood of PII-data breaches, which protects the organization's customers against potential data exposure, with its concomitant financial and reputational consequences.

Disclosed embodiments may provide proactive data management. Providing alerts during the design phase or at compile time enables users to make proactive decisions about data inclusion, which fosters a culture of privacy-conscious data management. In addition, via user-configurable settings, such as the sensitivity of PII classifier 335, users can tailor classification module 320 to their specific needs and regulatory requirements. Thus, disclosed embodiments provide a customizable solution that can be adapted for various use cases.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

generate a graphical user interface for construction of an integration process;

during or after the construction of the integration process, in a background, apply a personally identifiable information (PII) classifier to integration code, representing the integration process, to classify each of a plurality of fields in the integration code into one of a plurality of classifications, wherein the plurality of classifications comprises a PII class and a non-PII class, wherein the integration process comprises a mapping step that maps one or more input fields to one or more output fields, wherein the plurality of fields in the integration code comprises the one or more input fields and the one or more output fields, wherein the integration code comprises an input hierarchical structure of the one or more input fields and an output hierarchical structure of the one or more output fields, and wherein each of the one or more input fields is classified into one of the plurality of classifications based on a path of that input field within the input hierarchical structure;

determine one or more PII fields from the plurality of fields in the integration code based on the classifications of the plurality of fields; and exclude the one or more PII fields from being indexed into crowd-sourced historical data that are used for a predictive model.

2. A method comprising using at least one hardware processor to:

generate a graphical user interface for construction of an integration process;

during or after the construction of the integration process, in a background, apply a personally identifiable information (PII) classifier to integration code, representing the integration process, to classify each of a plurality of fields in the integration code into one of a plurality of classifications, wherein the plurality of classifications comprises a PII class, a non-PII class, and a potentially- PII class, wherein the PII classifier outputs, for each of the plurality of fields, a metric representing a likelihood that the field represents personally identifiable information, and wherein classifying each of the plurality of fields comprises, for each of the plurality of fields, when the metric satisfies a first threshold, classifying the field into the PII class, when the metric does not satisfy a second threshold, classifying the field into the non-PII class, and when the metric satisfies the second threshold but does not satisfy the first threshold, classifying the field into the potentially-PII class;

determine one or more PII fields from the plurality of fields in the integration code based on the classifications of the plurality of fields, wherein determining the one or more PII fields comprises for each of the plurality of fields that is classified into the PII class, automatically including that field in the one or more PII fields, and for each of the plurality of fields that is classified into the non-PII class. automatically excluding that field from the one or more PII fields; and exclude the one or more PII fields from being indexed into crowd-sourced historical data that are used for a predictive model.

3. A system comprising:

at least one hardware processor; and software that is configured to, when executed by the at least one hardware processor, generate a graphical user interface for construction of an integration process, during or after the construction of the integration process, in a background, apply a personally identifiable information (PII) classifier to integration code, representing the integration process, to classify each of a plurality of fields in the integration code into one of a plurality of classifications, wherein the plurality of classifications comprises a PII class and a non-PII class, wherein the integration process comprises a mapping step that maps one or more input fields to one or more output fields, wherein the plurality of fields in the integration code comprises the one or more input fields and the one or more output fields, wherein the integration code comprises an input hierarchical structure of the one or more input fields and an output hierarchical structure of the one or more output fields, wherein each of the one or more input fields is classified into one of the plurality of classifications based on a path of that input field within the input hierarchical structure, determine one or more PII fields from the plurality of fields in the integration code based on the classifications of the plurality of fields, and exclude the one or more PII fields from being indexed into crowd-sourced historical data that are used for a predictive model.

4. A non-transitory computer-readable medium having instructions stored therein, wherein the instructions, when executed by a processor, cause the processor to:

generate a graphical user interface for construction of an integration process;

during or after the construction of the integration process, in a background, apply a personally identifiable information (PII) classifier to integration code, representing the integration process, to classify each of a plurality of fields in the integration code into one of a plurality of classifications, wherein the plurality of classifications comprises a PII class and a non-PII class, wherein the integration process comprises a mapping step that maps one or more input fields to one or more output fields, wherein the plurality of fields in the integration code comprises the one or more input fields and the one or more output fields, wherein the integration code comprises an input hierarchical structure of the one or more input fields and an output hierarchical structure of the one or more output fields, and wherein each of the one or more input fields is classified into one of the plurality of classifications based on a path of that input field within the input hierarchical structure;

determine one or more PII fields from the plurality of fields in the integration code based on the classifications of the plurality of fields; and exclude the one or more PII fields from being indexed into crowd-sourced historical data that are used for a predictive model.

5. The method of claim 2, wherein the integration process comprises a mapping step that maps one or more input fields to one or more output fields, and wherein the plurality of fields in the integration code comprises the one or more input fields and the one or more output fields.

6. The method of claim 5, wherein the integration code comprises a name of each of the one or more input fields and one or more output fields, and wherein each of the one or more input fields and one or more output fields is classified into one of the plurality of classifications based on the names.

7. The method of claim 6, wherein the integration code comprises a hierarchical structure of the one or more input fields, and wherein each of the one or more input fields is classified into one of the plurality of classifications based on a path of that input field within the hierarchical structure of the one or more input fields.

8. The method of claim 7, wherein the integration code comprises a hierarchical structure of the one or more output fields, and wherein each of the one or more output fields is classified into one of the plurality of classifications based on a path of that output field within the hierarchical structure of the one or more output fields.

9. The method of claim 5, wherein the integration code comprises an input hierarchical structure of the one or more input fields and an output hierarchical structure of the one or more output fields, wherein each of the one or more input fields is classified into one of the plurality of classifications based on a path of that input field within the input hierarchical structure, and wherein each of the one or more output fields is classified into one of the plurality of classifications based on a path of that output field within the output hierarchical structure.

10. The method of claim 1, wherein the integration code comprises a function, and wherein the plurality of fields comprises one or more fields of the function.

11. The method of claim 10, wherein the one or more fields of the function comprise a default field for the function.

12. The method of claim 11, wherein the default field for the function is classified based on a classification of one or both of at least one input field to the function or at least one output field of the function.

13. The method of claim 1, wherein the PII classifier utilizes pattern matching to classify each of the plurality of fields.

14. The method of claim 1, wherein the PII classifier outputs, for each of the plurality of fields, a metric representing a likelihood that the field represents personally identifiable information, and wherein classifying each of the plurality of fields comprises, for each of the plurality of fields:

when the metric satisfies a first threshold, classifying the field into the PII class; and when the metric does not satisfy a second threshold, classifying the field into the non-PII class.

15. The method of claim 14, wherein determining the one or more PII fields comprises:

for each of the plurality of fields that is classified into the PII class, automatically including that field in the one or more PII fields; and for each of the plurality of fields that is classified into the non-PII class, automatically excluding that field from the one or more PII fields.

16. The method of claim 2, wherein determining the one or more PII fields further comprises, for each of the plurality of fields that have been classified into the potentially-PII class:

prompting a user to identify whether or not the field represents personally identifiable information;

receiving a user response to the prompt; and determining whether or not to include the field in the one or more PII fields according to the user response.

17. The method of claim 16, wherein the user is prompted during construction of the integration process.

18. The method of claim 16, wherein the user is prompted during compilation of the integration process.

19. The method of claim 14, further comprising using the at least one hardware processor to:

receive a user input indicating a sensitivity for the PII classifier; and set one or both of the first threshold and the second threshold based on the indicated sensitivity.

20. The method of claim 1, further comprising using the at least one hardware processor to:

derive a training dataset from the crowd-sourced historical data; and train the predictive model using the training dataset.

* * * * *